(12) United States Patent
Martz et al.

(10) Patent No.: US 11,572,815 B2
(45) Date of Patent: Feb. 7, 2023

(54) METHODS AND SYSTEMS FOR TURBINE BYPASS

(71) Applicant: Ford Global Technologies, LLC, Dearborn, MI (US)

(72) Inventors: Jason Martz, Canton, MI (US); Paul Joseph Tennison, West Bloomfield, MI (US); Michiel J. Van Nieuwstadt, Ann Arbor, MI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/303,999

(22) Filed: Jun. 11, 2021

(65) Prior Publication Data

US 2022/0397048 A1 Dec. 15, 2022

(51) Int. Cl.
| | |
|---|---|
| *F01N 3/20* | (2006.01) |
| *F02B 37/18* | (2006.01) |
| *F01N 13/08* | (2010.01) |
| *F02B 37/02* | (2006.01) |
| *F02B 37/24* | (2006.01) |

(52) U.S. Cl.
CPC ........... *F01N 3/2006* (2013.01); *F01N 3/208* (2013.01); *F01N 13/087* (2013.01); *F02B 37/18* (2013.01); *F02B 37/025* (2013.01); *F02B 37/24* (2013.01); *F05D 2220/40* (2013.01)

(58) Field of Classification Search
CPC ...... F01N 3/2006; F01N 3/208; F01N 13/087; F02B 37/025; F02B 37/18; F02B 37/24; F05D 2220/40
See application file for complete search history.

(56) References Cited

U.S. PATENT DOCUMENTS

| | | | |
|---|---|---|---|
| 9,835,082 B2 | 12/2017 | VanDerWege | |
| 9,932,886 B2 | 4/2018 | Lombard et al. | |
| 10,480,369 B1 * | 11/2019 | Dahodwala | ............ F01N 3/106 |
| 2002/0078934 A1 | 6/2002 | Hohkita et al. | |
| 2011/0011082 A1 * | 1/2011 | Mehta | ..................... F02B 37/18 |
| | | | 60/299 |
| 2014/0360185 A1 * | 12/2014 | Boyer | .................... F02M 26/04 |
| | | | 60/273 |
| 2016/0108798 A1 * | 4/2016 | VanDerWege | .......... F02B 37/12 |
| | | | 60/602 |
| 2018/0045101 A1 * | 2/2018 | Turner | ................... F02B 37/007 |
| 2018/0170353 A1 * | 6/2018 | Ulrey | ................... F02D 13/0234 |

* cited by examiner

*Primary Examiner* — Brandon D Lee
(74) *Attorney, Agent, or Firm* — Vincent Mastrogiacomo; McCoy Russell LLP

(57) ABSTRACT

Methods and systems are provided for a turbocharger. In one example, a method may include bypassing exhaust gases flowing to the turbocharger in response to a catalyst temperature being less than a threshold temperature. The bypassing includes opening a bypass valve and adjusting a position of one or more turbine nozzle vanes.

17 Claims, 9 Drawing Sheets

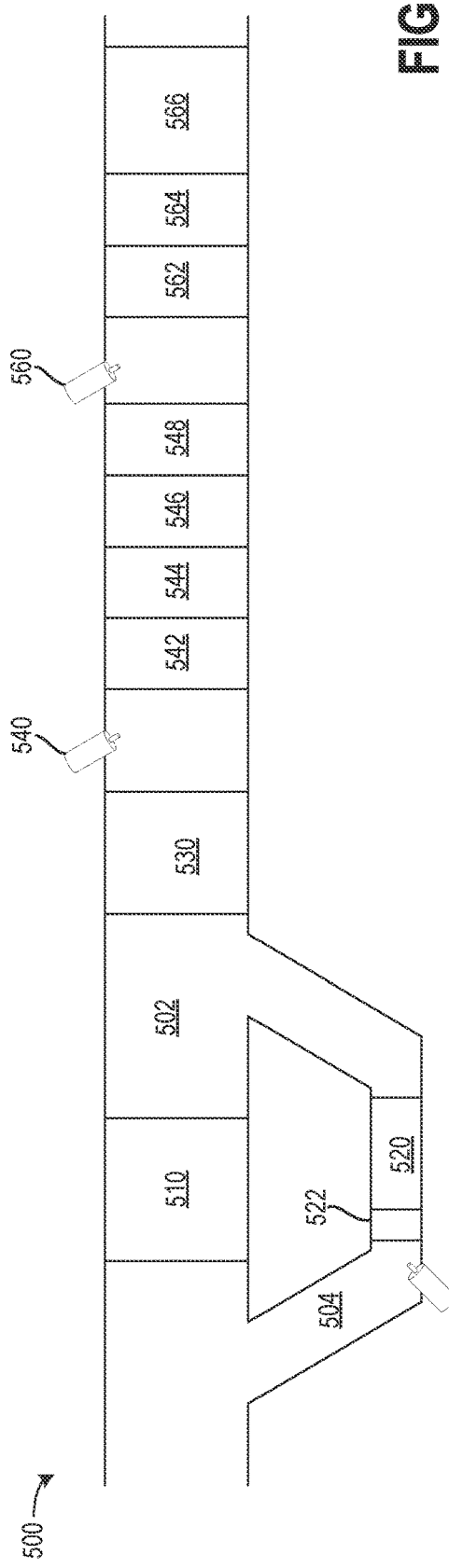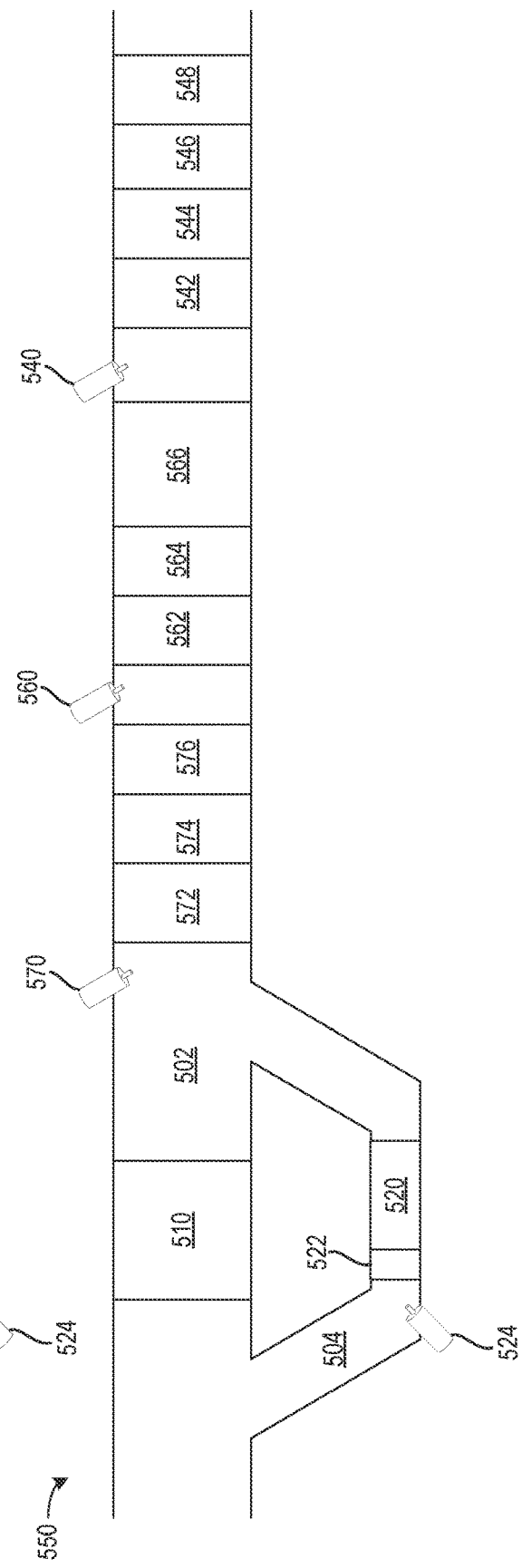

| Mode | Byp cat temp | 1st cat temp | 2nd cat temp | Action |
|---|---|---|---|---|
| 1 | ≥ byp cat thresh | ≥ 1st cat thresh | ≥ 2nd cat thresh | Exit bypass mode, flow exhaust gas to turbine |
| 2 | < byp cat thresh | ≥ 1st cat thresh | ≥ 2nd cat thresh | Exit bypass mode, flow exhaust gas to turbine |
| 3 | < byp cat thresh | < 1st cat thresh | ≥ 2nd cat thresh | Exit bypass mode, flow exhaust gas to turbine |
| 4 | ≥ byp cat thresh | < 1st cat thresh | ≥ 2nd cat thresh | Exit bypass mode, flow exhaust gas to turbine |
| 5 | < byp cat thresh | < 1st cat thresh | < 2nd cat thresh | Bypass mode, decrease AFR |
| 6 | ≥ byp cat thresh | ≥ 1st cat thresh | < 2nd cat thresh | Electric heater ON, bypass mode |
| 7 | ≥ byp cat thresh | < 1st cat thresh | < 2nd cat thresh | Electric heater ON, bypass mode |
| 8 | < byp cat thresh | ≥ 1st cat thresh | < 2nd cat thresh | Electric heater ON, bypass mode |
| 9 | < byp cat thresh | < 1st cat thresh | < 2nd cat thresh | Electric heater ON, bypass mode |

FIG. 6

METHODS AND SYSTEMS FOR TURBINE BYPASS

FIELD

The present description relates generally to methods and systems for bypassing exhaust gas around a turbine in response to temperatures of one or more catalysts.

BACKGROUND/SUMMARY

Engines may use a turbocharger to improve engine torque and/or power output density. A turbocharger may include a turbine disposed in line with the engine's exhaust stream and coupled via a drive shaft to a compressor disposed in line with the engine's intake air passage. The exhaust-driven turbine may then supply energy, via the drive shaft, to the compressor to boost the intake air pressure. In this way, the exhaust-driven turbine supplies energy to the compressor to boost the pressure and flow of air into the engine. Therefore, increasing the rotational speed of the turbine may increase boost pressure. The desired amount of boost may vary over operation of the engine. For example, the desired boost may be greater during tip-ins than during tip-outs.

One solution to control the boost pressure is the use of a variable geometry turbine in the turbocharger. A variable geometry turbine controls boost pressure by varying the flow of exhaust gas through the turbine. For example, exhaust gas may flow from the exhaust manifold through a turbine nozzle and to the turbine blades. The geometry of the turbine nozzle may be varied to control the angle that exhaust gas contacts the turbine blades and/or to vary the cross-sectional area of inlet passages, or throat, upstream of the turbine blades. Increasing the cross-sectional area of the inlet passages may allow more gas to flow through the passages. Furthermore, the angle of incidence of gas flowing across the turbine blades may affect the efficiency of the turbine, e.g., the amount of thermodynamic energy captured from the flow that is converted to mechanical energy. Thus, the turbine speed and boost pressure may be varied by changing the geometry of the turbine nozzle.

The design of variable geometry turbines has been modified to yield various desirable results. For example, U.S. Pat. No. 9,835,082 by Van Der Wege discloses systems and methods for operating a multi-scroll turbocharger. The multi-scroll turbocharger may include vanes for adjusting gas flow to scrolls of the turbines. The vanes are adjusted to optimize exhaust gas flows based on a desired turbine speed. Other examples in the art may include a wastegate or other form of bypass in combination with vanes to bypass exhaust gases around a single scroll turbine.

However, the inventors have identified some issues with the approach described above. For example, the turbine housing and blade may adsorb a high amount of heat during various conditions, which may prolong a catalyst warm-up or result in a catalyst temperature falling below a desired temperature. Operation of a wastegate during conditions where catalyst heating is desired may be insufficient as catalyst heating is prolonged and emissions are increased during that time.

There are further issues to bypassing exhaust gases in turbine systems with one or more scrolls. Bypass modes thereof may introduce EGR shortfalls due to incorrect throttle positioning. Furthermore, previous methods for the bypass modes may not bypass a sufficient amount of exhaust gas around the turbine to block heat loss to the turbine and its housing. There is thus a demand for a bypass mode configured to rapidly heat an exhaust gas catalyst with minimal heat loss to a turbine housing while maintaining a desired engine combustion stability.

In one example, the issues described above may be addressed by a system for a turbine comprising a bypass and a bypass valve, a first catalyst arranged in the bypass, a second catalyst arranged in an exhaust passage downstream of an intersection between the bypass and the exhaust passage relative to a direction of exhaust gas flow, and a plurality of vanes configured to adjust gas flow through one or more inlets of the turbine. The system further includes a controller comprising computer-readable instructions stored on non-transitory memory thereof that cause the controller to adjust a position of the bypass valve and the plurality of vanes in response to one or more of a first catalyst temperature being less than a threshold first catalyst temperature and a second catalyst temperature being less than a threshold second catalyst temperature. By doing this, an exothermic reaction of the first catalyst may be used to heat the second catalyst.

In one example, the turbocharger is a divided inlet turbocharger or a twin-scroll turbocharger. Exhaust gas flows from separate cylinder banks may be routed to a bypass during a catalyst heating mode in response to the second catalyst temperature. In one example, a first catalyst is arranged in the bypass and configured to oxidize fuel in the exhaust gas flow. In doing so, the first catalyst may generate heat (e.g., an exotherm) due to oxidation of the fuel, wherein the heat generated by the first catalyst is used to heat a second catalyst arranged in an exhaust passage downstream of the bypass and the turbine. By doing this, catalyst temperatures may be maintained, which may decrease emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A shows a first embodiment of an emission control system arrangement.

FIG. 5B shows a second embodiment of an emission control system arrangement.

FIG. 6 shows a chart illustrating different operating modes of the systems of FIGS. 1-4 in response to conditions.

DETAILED DESCRIPTION

Figure 1:
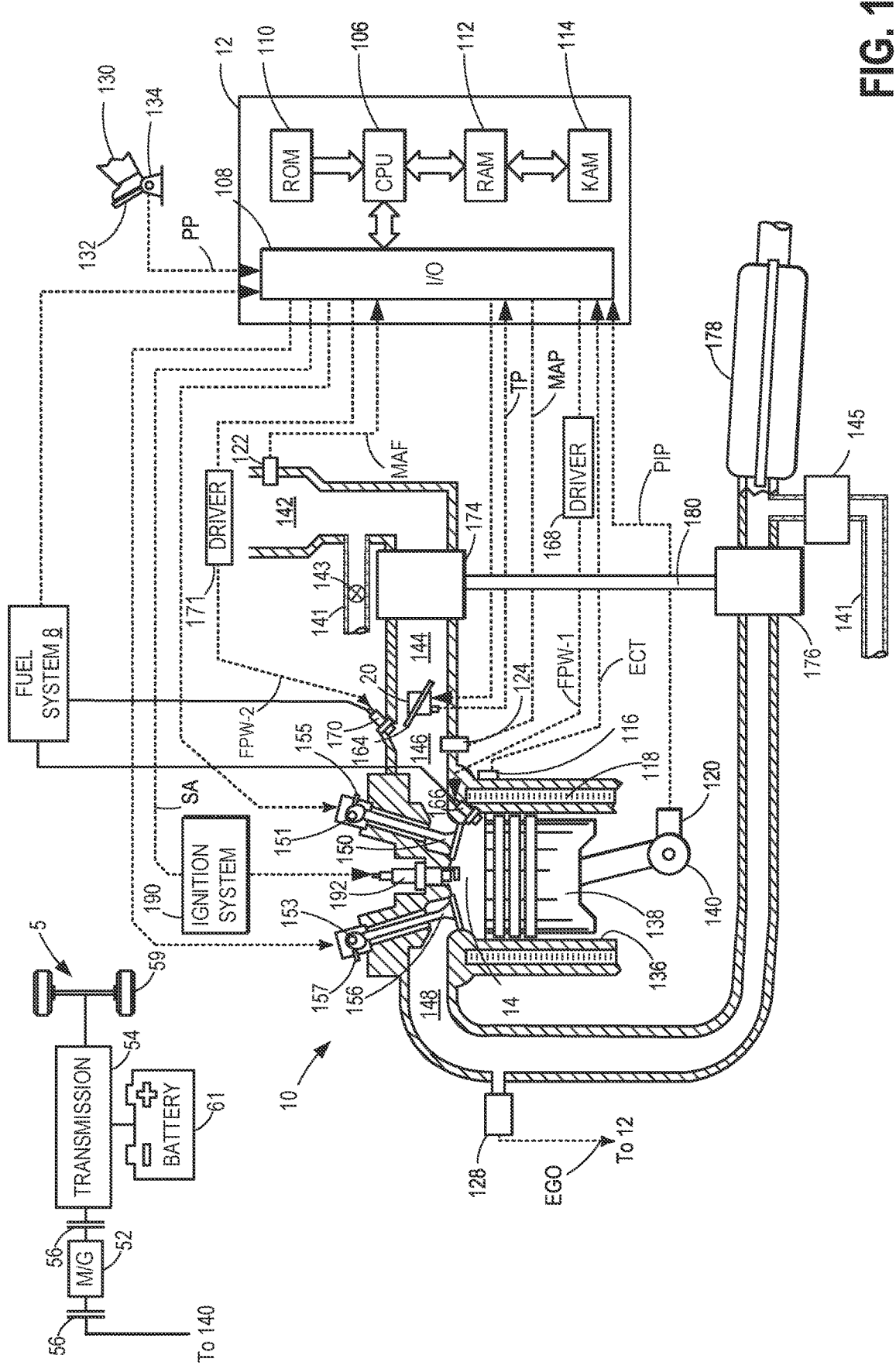
FIG. 1 shows an example of an engine in a hybrid vehicle.
Figure 2:
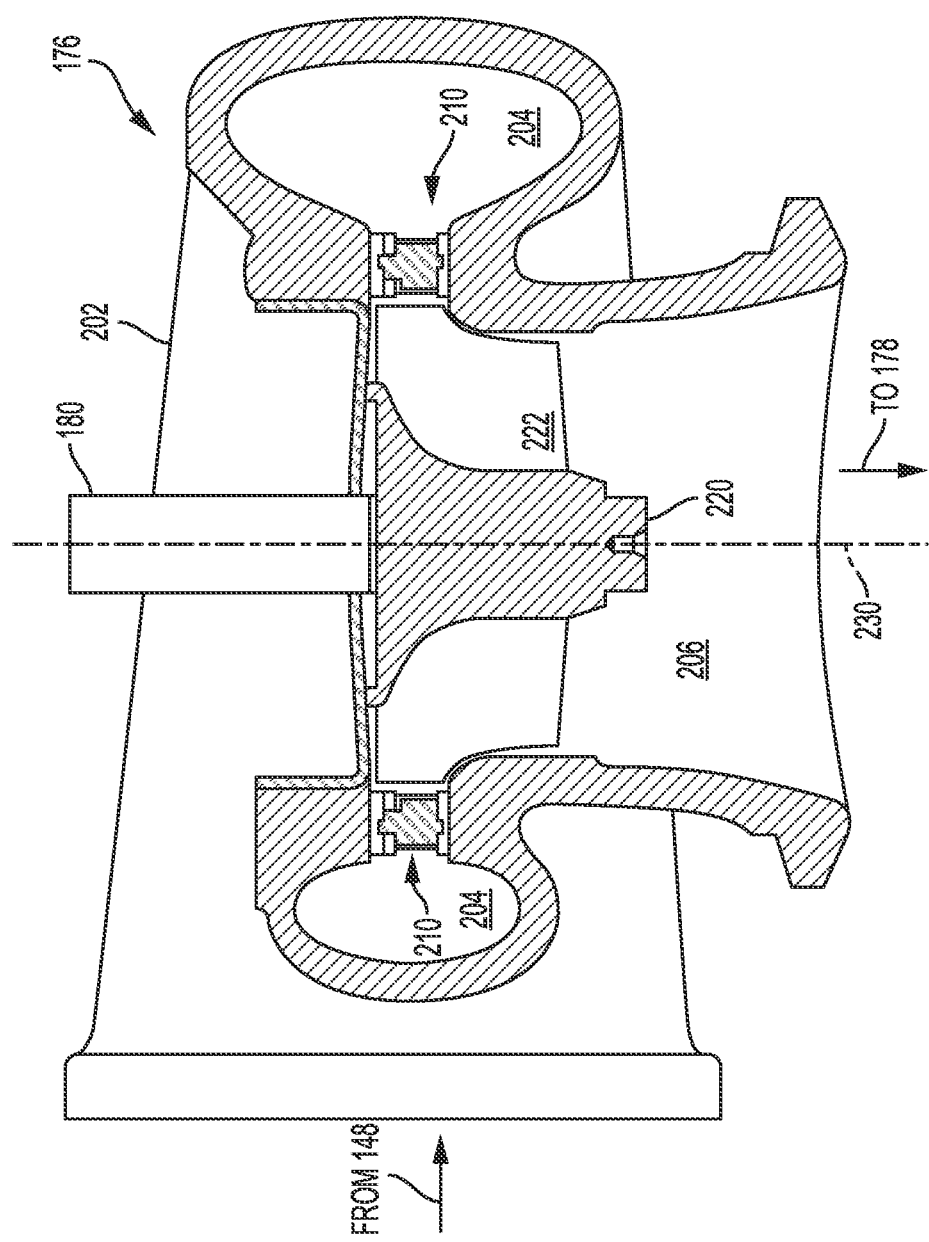
FIG. 2 shows a cross-section of an example embodiment of a turbine of a turbocharger of the engine of FIG. 1.
Figure 3:
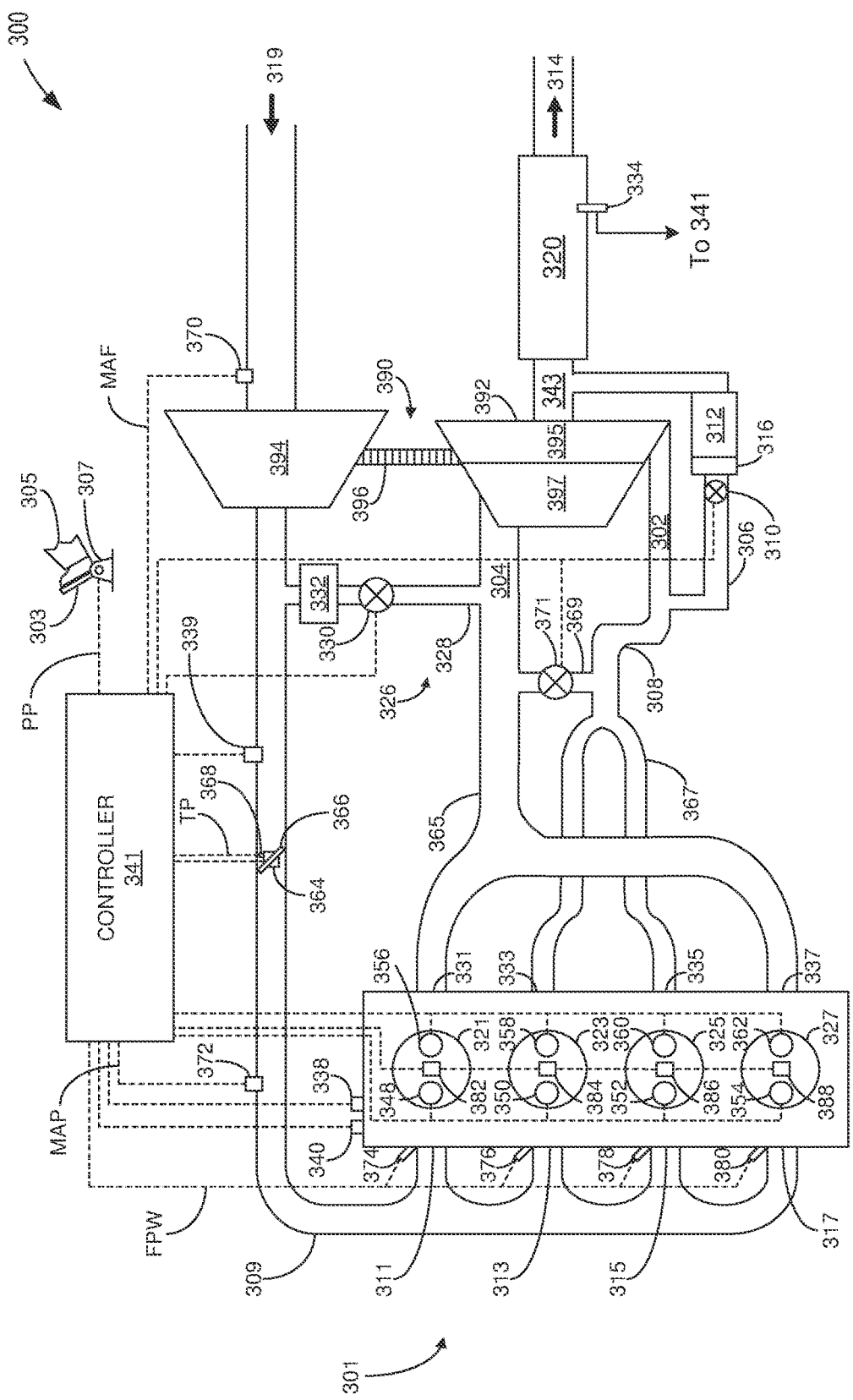
FIG. 3 shows a schematic depiction of a boosted engine system including a binary flow turbine.
Figure 4:
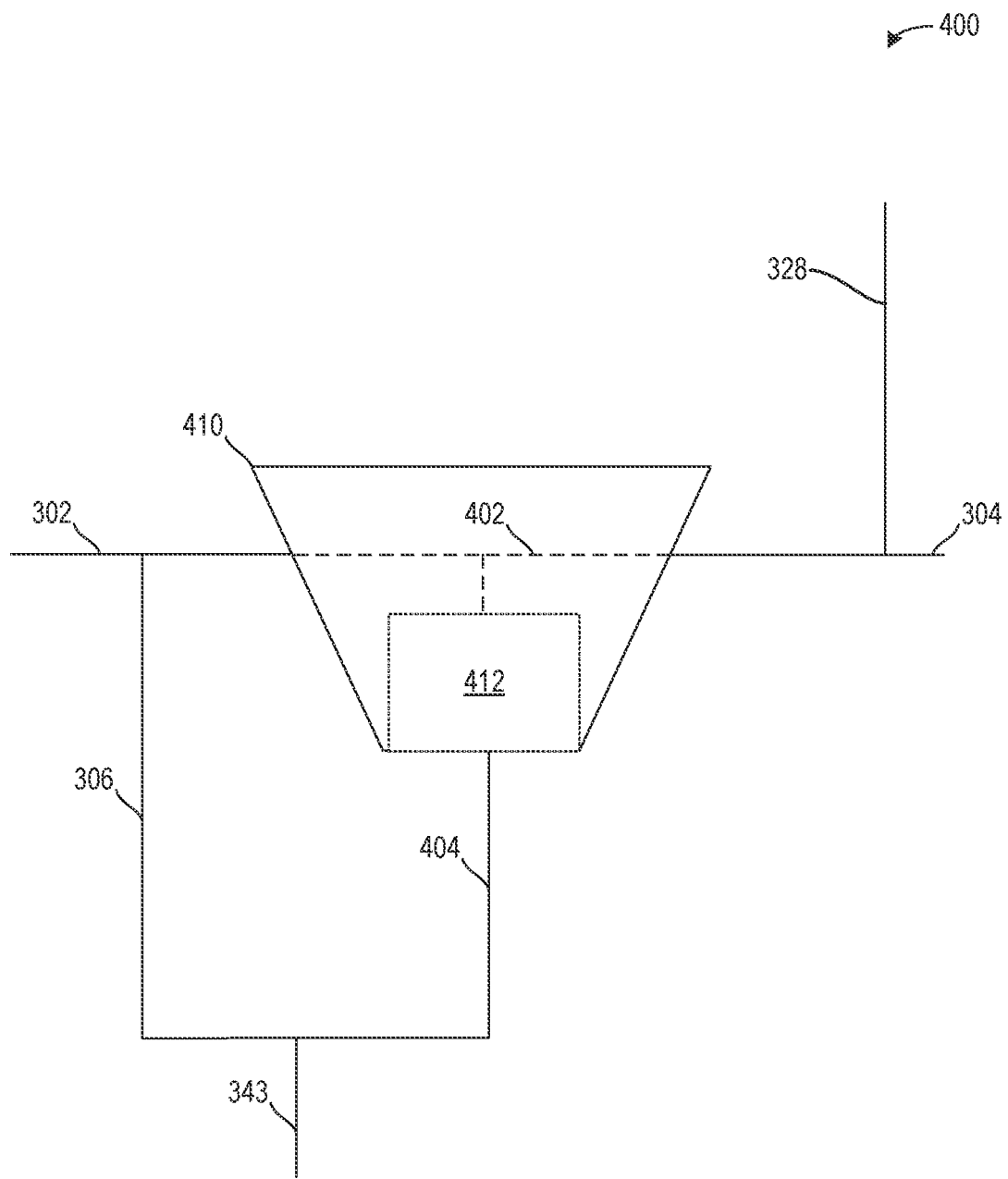
FIG. 4 shows an example of a turbine including a divided inlet.

The following description relates to systems and methods for turbocharger operation in response to a catalyst temperature. In one example, a bypass valve of a turbine is opened in response to a catalyst temperature being less than a threshold temperature. The catalyst may be arranged in an exhaust passage fluidly coupled to an engine, as shown in FIG. 1. The engine may include a turbocharger, including a turbine and a compressor. In one example, the turbine is a variable geometry turbine (VGT), as shown in FIG. 2. The turbine may be one of two or more turbines of a twin-scroll turbocharger, as shown in FIG. 3. A first catalyst may be arranged in the bypass, wherein an electric heater may be used to heat the first catalyst A bypass valve, which may be arranged outside the turbine housing or within the housing as a wastegate, may be configured to bypass exhaust gases around impellers of the turbine. An example of a turbine including a divided inlet for separate cylinder banks of an engine is shown in FIG. 4. Example configurations of an emission control system are shown in FIGS. 5A and 5B.

Figure 7A:
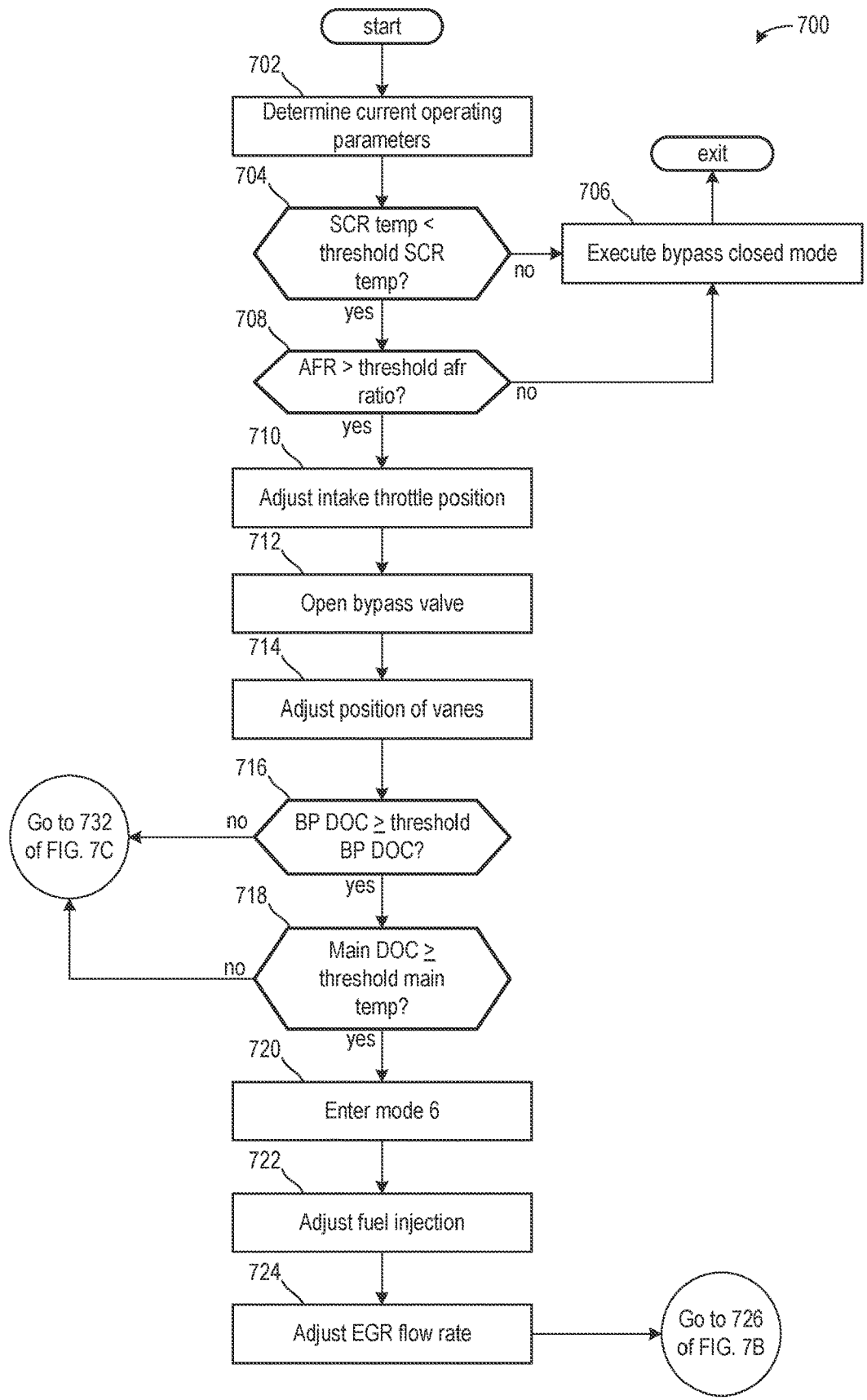
FIGS. 7A, 7B, and 7C show a method for entering and exiting a turbine bypass mode in response to catalyst temperatures.
Figures 7B, 7C:
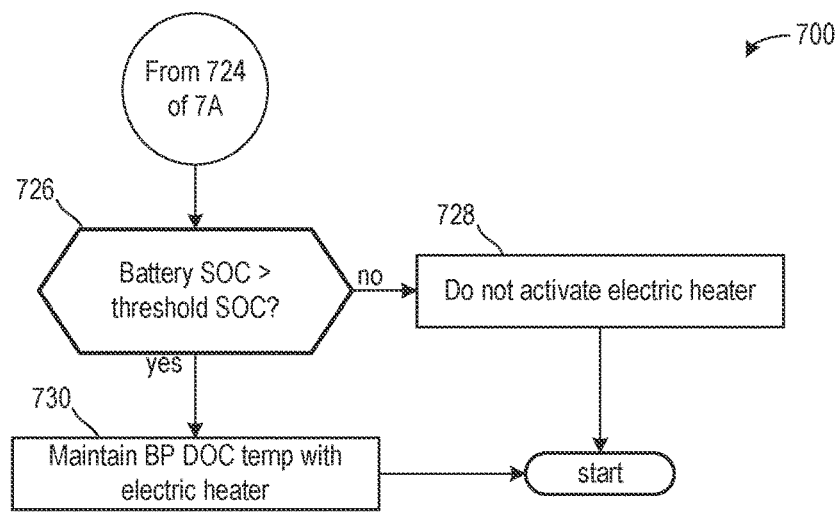
Figure 8:
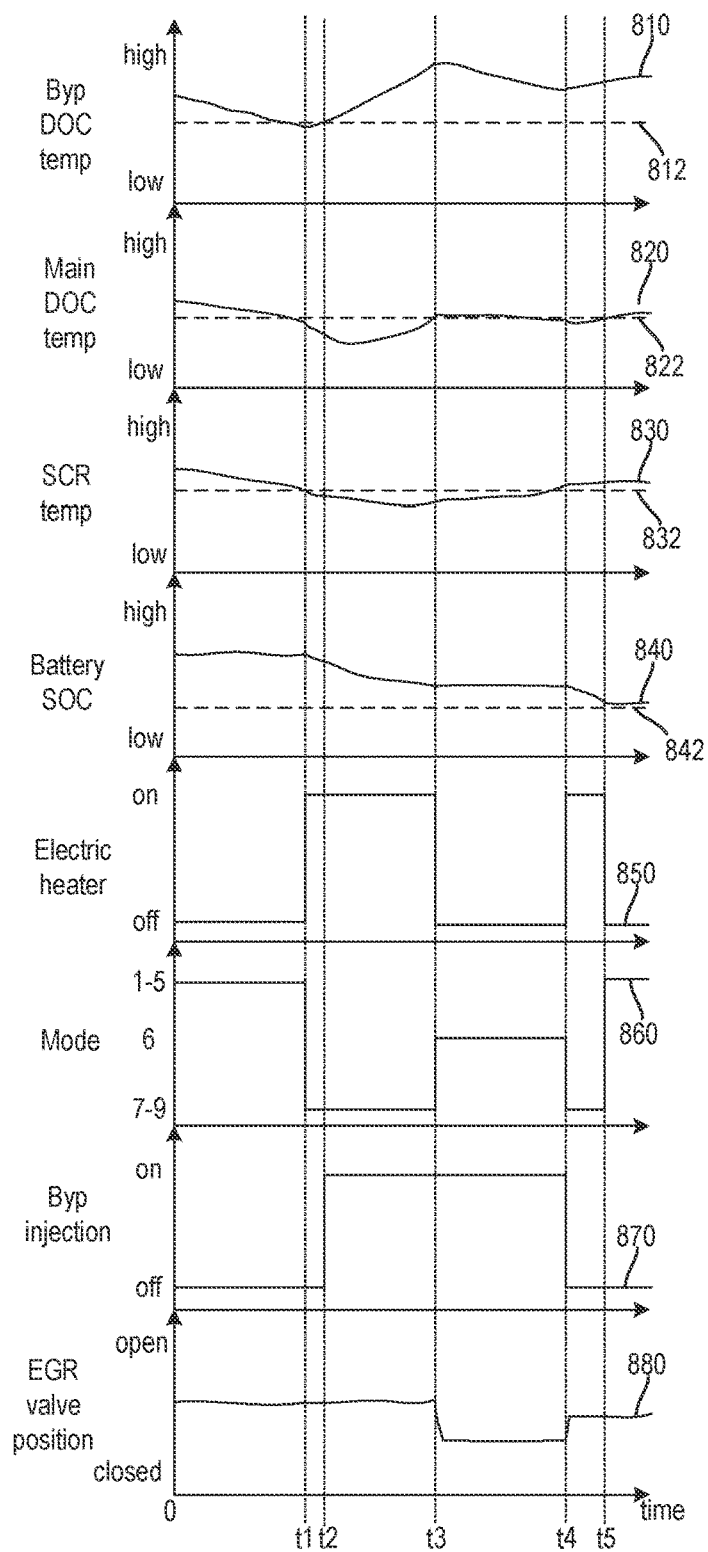
FIG. 8 shows a graphical illustration of a prophetic engine operating sequence based on the method of FIGS. 7A-7C.

A chart illustrating various operating modes of the turbocharger, the bypass valve, and the electric heater are illustrated in FIG. 6 in response to the first catalyst temperature and a second catalyst temperature. A method for selecting between different turbine bypass modes is illustrated in FIGS. 7A, 7B, and 7C. A graphical illustration of engine operating conditions changing in response to the bypass mode is shown in FIG. 8.

Turning now to FIG. 1, it depicts an example embodiment of a combustion chamber or a cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 20 including a throttle plate 164 may be provided along an intake passage of the engine for varying the flow rate and/or pressure of intake air provided to the engine cylinders. For example, throttle 20 may be disposed downstream of compressor 174, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different times from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 59 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The flow of exhaust gases through turbine 176 may be further illustrated by the example embodiment of turbine 176 in FIG. 2. Components previously introduced may be identically numbered in this and subsequent figures. Turbine 176 may include a volute or housing 202 that encloses the turbine nozzle 210 and the turbine wheel 220 having turbine blades 222. For example, housing 202 may include an inlet passage 204 in communication with turbine nozzle 210. Thus, exhaust gas may flow from exhaust passage 148, through inlet passage 204, through the turbine nozzle 210, across the turbine wheel 220 and the turbine blades 222 into an outlet passage 206, and out to exhaust passage 148 toward the emission control device 178. Further, by varying the geometry of the turbine nozzle 210, the flow of exhaust gases, e.g. the expansion of gases, through turbine 176 may be regulated which may also control the rotational speed of turbine 176. The turbine nozzle 210 may be controlled and/or monitored via a signal line coupled with controller 12 (FIG. 1).

In one example, turbine nozzle 210 may be generally annular and share a central axis 230 with turbine wheel 220 and drive shaft 180. Turbine nozzle 210 may circumferentially surround the turbine wheel 220 and turbine blades 222, forming a ring around the turbine blades 222. In other words, turbine wheel 220 and turbine nozzle 210 may be coaxial and concentric.

In order to vary gas flow through a turbine nozzle, such as turbine nozzle 210 described above of FIG. 2, of a variable geometry turbine, the turbine nozzle may include a nozzle vane system comprising a plurality of sliding vanes and fixed vanes, arranged in the direct path of gas flow from the exhaust manifold to the turbine. The nozzle vane system comprises openings that may be narrowed or widened to govern the amount of flow reaching a turbine wheel based on a desired boost pressure to be delivered to an engine, such as engine 10 of FIG. 1. Additionally or alternatively, the nozzle vane system may be adjusted to block an opening of the inlet passage 204, such that exhaust gases are blocked from flowing to the turbine blades 222. Adjusting the nozzle vane system is described in greater detail below.

Turning now to FIG. 3, it shows a schematic diagram of a boosted engine system 300 including a binary flow or twin-scroll turbine 392, which may be included in a propulsion system of an automobile. Engine 301 may be controlled at least partially by a control system including controller 341 and by input from a vehicle operator 305 via an input device 303. In this example, input device 303 includes an accelerator pedal and a pedal position sensor 307 for generating a proportional pedal position signal PP. In one example, engine 301 may be used similarly to engine 10 of FIG. 1 and controller 341 may be used similarly to controller 12 of FIG. 1.

Engine 301 may include a plurality of combustion chambers (i.e., cylinders). In the example shown in FIG. 3, engine 301 includes combustion chambers 321, 323, 325, and 327, arranged in an in-line 4-cylinder configuration. It should be understood, however, that although FIG. 3 shows four cylinders, engine 301 may include any number of cylinders in any configuration, e.g., V-8, V-6, I-6, V-12, opposed 4, etc. FIG. 3 may also represent either of the two banks of a V-8 engine.

Each combustion chamber (i.e., cylinder) of engine 301 may include combustion chamber walls with a piston positioned therein (as shown in FIG. 1). The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 301.

Each combustion chamber may receive intake air from an intake manifold 309 via an air intake passage 319. Intake manifold 309 may be coupled to the combustion chambers via intake ports. For example, intake manifold 309 is shown in FIG. 3 coupled to cylinders 321, 323, 325, and 327 via intake ports 311, 313, 315, and 317, respectively. Each respective intake port may supply air and/or fuel to the respective cylinder for combustion.

Each combustion chamber may exhaust combustion gases via an exhaust port coupled thereto. For example, exhaust ports 331, 333, 335, and 337 are shown in FIG. 3 coupled to cylinders 321, 323, 325, and 327, respectively. Each respective exhaust port may direct exhaust combustion gases from a respective cylinder to an exhaust manifold or exhaust passage. In the present example, the exhaust manifold is a divided exhaust manifold wherein exhaust ports of selected cylinders direct exhaust to distinct exhaust manifolds. In the present depiction, exhaust ports 331 and 337 direct exhaust combustion gases of cylinders 321 and 327 to exhaust manifold segment 365 while exhaust ports 333 and 335 direct exhaust combustion gases of cylinders 323 and 325 to exhaust manifold segment 367. In alternate examples, each of exhaust ports 331, 333, 335, 337 may direct exhaust combustion gases from a respective cylinder to a common, undivided exhaust manifold. Each cylinder intake port can selectively communicate with the cylinder via an intake valve. For example, cylinders 321, 323, 325, and 327 are shown in FIG. 3 with intake valves 348, 350, 352, and 354, respectively. Likewise, each cylinder exhaust port can selectively communicate with the cylinder via an exhaust valve. For example, cylinders 321, 323, 325, and 327 are shown in FIG. 3 with exhaust valves 356, 358, 360, and 362, respectively. In some examples, each combustion chamber may include two or more intake valves and/or two or more exhaust valves.

Each intake and exhaust valve may be operated by an intake cam and an exhaust cam, as shown in FIG. 1. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor. In this way, cylinders 321, 323, 325, and 327 may be a non-limiting example of cylinder 14 of FIG. 1.

Intake passage 319 may include a throttle 364 having a throttle plate 366. In this particular example, the position of throttle plate 366 may be varied by controller 341 via a signal provided to an electric motor or actuator included with throttle 364, a configuration that is commonly referred to as electronic throttle control (ETC). In this manner, throttle 364 may be operated to vary the intake air provided the combustion chambers. The position of throttle plate 366 may be provided to controller 341 by throttle position signal TP from a throttle position sensor 368. Intake passage 319 may include a mass air flow sensor 370 and a manifold air pressure sensor 372 for providing respective signals MAF and MAP to controller 341.

In FIG. 3, fuel injectors are shown coupled directly to the combustion chambers for injecting fuel directly therein in proportion to a pulse width of a signal FPW received from controller 341 via an electronic driver, for example. For example, fuel injectors 374, 376, 378, and 380 are shown in FIG. 3 coupled to cylinders 321, 323, 325, and 327, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 309 in a configuration that provides what is known as port injection of fuel into the intake ports upstream of the respective combustion chambers. Though not shown in FIG. 3, fuel may be delivered to the fuel injectors by a fuel system including a fuel tank, a fuel pump, a fuel line, and a fuel rail.

The combustion chambers of engine 301 may be operated in a compression ignition mode, with or without an ignition spark. In some examples, a distributorless ignition system (not shown) may provide ignition sparks to spark plugs coupled to the combustion chambers in response to controller 341. For example, spark plugs 382, 384, 386, and 388 are shown in FIG. 3 coupled to cylinders 321, 323, 325, and 327, respectively.

Engine 301 may include a turbocharger 390. The turbocharger 390 may be a non-limiting example of the turbocharger of FIG. 1. Turbocharger 390 may include a turbine 392 and a compressor 394 coupled on a common shaft 396. The blades of the turbine 392 may be caused to rotate about the common shaft as a portion of the exhaust gas stream discharged from engine 301 impinges upon the blades of the turbine. The compressor 394 and turbine 392 are rotatably coupled to the common shaft 396 such that compressor 394 may be actuated when the blades of turbine 392 are caused to rotate. When actuated, compressor 394 may then direct pressurized gas to air intake manifold 309 from where it may then be directed to engine 301. In this way, turbocharger 390 may be configured for providing a boosted aircharge to the engine intake.

Turbocharger 390 may be configured as a multi-scroll turbocharger wherein the turbine includes a plurality of scrolls. In the depicted embodiment, turbine 392 includes two scrolls, a first scroll 395 and a second scroll 397. The first scroll may be an outer scroll while the second scroll may be an inner scroll. Alternatively, the scrolls may be positioned laterally relative to each other. The scrolls may be referred to as a high flow scroll and a low flow scroll, wherein the high flow scroll is the scroll that improves turbine response at high flow conditions, and wherein the low flow scroll is the scroll that improves turbine response at low flow conditions. In one example, the low flow scroll is the outer scroll while the high flow scroll is the inner scroll. In an alternate example, the low flow scroll is the inner scroll while the high flow scroll is the outer scroll.

Each scroll may receive exhaust gas from a distinct set of cylinder via distinct exhaust manifold segments and distinct inlets. Specifically, exhaust gas from cylinders 321 and 327 may flow along a second exhaust gas entry path 304 into second scroll 397 while exhaust from cylinders 323 and 325 flows along a first exhaust gas entry path 302 into first scroll 395. In addition, a conduit 369, with a communication valve 371, may couple exhaust manifold segment 365 with exhaust manifold segment 367 upstream of the turbine 392. In doing so, exhaust from all cylinders may be directed to each of the scrolls when desired.

In one example, the first scroll 395 and the second scroll 397 may be non-limiting examples of the turbine 176 of FIGS. 1 and 2. As such, each of the first scroll 395 and the second scroll 397 may include nozzle vanes configured to adjust based on a desired turbine speed and a desired exhaust gas flow rate. In one example, the nozzle vanes may move to a closed position, thereby sealing one or more of the first scroll 395 and the second scroll 397.

A bypass valve 310 may be coupled across turbine 392. Specifically, bypass valve 310 may be included in a bypass 308 coupled between an inlet and outlet of the exhaust turbine. By adjusting a position of bypass valve 310, an amount exhaust gas flowing around the turbine 392 may be adjusted. While the depicted example shows bypass 308 coupling exhaust manifold segment 367 to the outlet of the turbine 392, in an alternate example, bypass 308 may additionally or alternatively couple exhaust manifold segment 365 to the outlet of the turbine. However, to reduce packaging, vanes of the turbine 392 may be adjusted such that exhaust gases from the exhaust manifold segments 365 and 376 may each be routed through the bypass 308 such that all exhaust gas may be bypassed around the turbine 392 during some conditions.

Exhaust gases may also be recirculated from the one or both of the exhaust manifold segments 365, 367 (herein depicted being recirculated from only exhaust manifold segment 365) to intake passage 319 via an exhaust gas recirculation (EGR) passage 328. EGR passage 328 may include an EGR valve 330 for controlling an amount of EGR as well as an EGR cooler for controlling a temperature of the EGR delivered to the engine intake.

Exhaust gases exiting bypass valve 310 may pass through an emission control device 312. In one example, the emission control device 312 is a first catalyst configured to execute a first catalytic reaction (e.g., oxidation of fuel), wherein another emission control device arranged in an exhaust passage 343 is a second catalyst 320, arranged downstream of an intersection between the exhaust passage 343 and bypass 306, may be configured to execute a second catalytic reaction (e.g., reduction of $NO_R$). The position of the bypass valve 310 may be adjusted in response to one or more of a temperature of the first catalyst 312 or the second catalyst 320. In one example, the controller 341 adjusts the position of the bypass valve 310 in response to feedback from a temperature sensor 334 integrally arranged within the second catalyst 320. That is to say, in one example, the bypass valve 310 is opened in response to only a temperature of the second catalyst 320. A temperature of the first catalyst 312 may be maintained via an electric heater 316. The electric heater 316 may be adjacent to the first catalyst 312. In one example, the electric heater 316 is packaged within a common housing of the first catalyst 312 to decrease packaging constraints. The controller 341 may be configured to signal to an actuator of the electric heater 316 to adjust a heating thereof. After flowing through the second catalyst 320, exhaust gases may flow to a tailpipe 314 or through additional catalysts. In one example, each of the first catalyst 312 and the second catalyst 320 are diesel oxidation catalysts.

In some examples, controller 341 may be a conventional microcomputer including: a microprocessor unit, input/output ports, read-only memory, random access memory, keep alive memory, and a conventional data bus. Controller 341 is shown in FIG. 3 receiving various signals from sensors coupled to engine 301, in addition to those signals previously discussed, such as the sensors previously described in reference to FIGS. 1 and 2. Based on the input from the various sensors, controller 341 may be configured to perform various control routines and actuate one or more engine actuators. The actuators may include, for example, intake throttle 364, EGR valve 330, bypass valve 310, and the turbine nozzle, in addition to the actuators previously described in reference to FIGS. 1 and 2. Controller 341 may be identical to controller 12 of FIG. 1.

For example, adjusting a position of the bypass valve 310 may include adjusting an actuator of the bypass valve to adjust exhaust gas flow away from the turbine 392. In one example, the position of the bypass valve 310 may be adjusted in response to a catalyst temperature, such as a temperature of second catalyst 320, being less than a threshold temperature. The catalyst temperature may be sensed by the temperature sensor 334. Feedback from the temperature sensor 334 may be sent to controller 341, which may be used to determine if adjustments to bypass valve 310 and turbine 392 operation are desired. In one example of the present disclosure, the controller may signal to an actuator of the turbine nozzle vanes to actuate the vanes to a fully closed position. The controller may then signal to the actuator of the bypass valve 310 to actuate the bypass valve 310 to a fully open position. As such, exhaust gases in the first and second entry paths 302 and 304 may be routed to the bypass 308 and away from turbine 392. In one example, fully closing the vanes and fully opening the bypass valve may result in a large portion (e.g., greater than 60%) of exhaust gases bypassing the turbine 392. Additionally or alternatively, the controller 341 may signal to an actuator of the EGR valve 330 to adjust a pressure differential between the first and second entry paths 302 and 304. In one example, the EGR valve 330 is moved to a more closed position to increase the second entry path pressure relative to the first entry path pressure while still meeting a desired EGR demand based on $NO_x$ generation. Heating the second catalyst 320 by bypassing the turbine 392 is described in greater detail below.

Turning now to FIG. 4, it shows an embodiment 400 of a turbine 410 including a first inlet fluidly coupled to the first exhaust gas entry path 302 and a second inlet fluidly coupled to the second exhaust gas entry path 304. The first inlet may receive exhaust gases from only a first cylinder bank including the cylinders 323 and 325 of FIG. 3 and the second inlet may receive exhaust gases from only a second cylinder bank including the cylinders 321 and 327 of FIG. 3. It will be appreciated that the cylinder banks may be configured differently without departing form the scope of the present disclosure. For example, the cylinder banks may be divided to include adjacent cylinders rather than outer and inner cylinders.

The turbine 410 includes an interconnecting passage 402 in which exhaust gases from the first and second inlets may mix prior to flowing to a turbine blade 412. During the catalyst heating mode, conditions may be adjusted to flow exhaust gases to the bypass 306, such as opening a bypass valve (e.g., bypass valve 310 of FIG. 3) and adjusting one or more vanes of the turbine blade 412 to block exhaust gas flow thereto. In one example, a pressure balance between the first inlet and the second inlet is adjusted to both promote a desired amount of EGR flow to the EGR passage 328 while also maintaining a pressure of the second inlet such that gases from the second inlet flow through the interconnecting passage 402, through the first inlet, and into the bypass 306. By doing this, exhaust gas flow through the turbine may be limited (e.g., blocked), and exhaust gases are routed around the turbine.

The pressure balance may be adjusted by adjusting a throttle position, such as throttle 364, which may directly or indirectly lead to an adjustment of EGR valve 330. By doing this, the EGR rate may be set, which may adjust the pressure of the second inlet. For example, more open EGR valve positions may correspond to lower second inlet pressures. Additionally, the bypass valve may be adjusted to adjust the pressure of the first inlet, wherein more open bypass valve positions may correspond to lower first inlet pressures. Thus, in one example, the EGR valve may be more closed than the bypass valve during the catalyst heating mode to allow gases from the second cylinder bank to mix with gases from the first cylinder bank in the bypass 306.

Turning now to FIGS. 5A and 5B, they show a first embodiment 500 and a second embodiment 550 of an emission control system including a plurality of aftertreatment devices. Each of the first embodiment 500 and the second embodiment 550 includes a turbine 510 and a bypass passage 504 fluidly coupled to an exhaust passage 502. The turbine 510 may be a non-limiting example of the turbine 176 of FIGS. 1 and 2, turbine 392 of FIG. 3, and/or turbine 410 of FIG. 4. The bypass passage 504 may include a first aftertreatment device 520 and an electric heater 522. In each of the first embodiment 500 and the second embodiment 550, an injector 524 may be positioned to inject fuel into the bypass passage 504 toward the first aftertreatment device 520. In some examples, the injector 524 may be omitted and fuel may be provided to the first aftertreatment device 520 via a reduction of an air/fuel ratio, as will be described in greater detail herein. In one example, the first aftertreatment device 520 is a diesel oxidation catalyst (DOC).

The first embodiment 500 may include a second aftertreatment device 530 arranged directly downstream of an intersection between the bypass passage 504 and the exhaust passage 502. In one example, the second aftertreatment device 530 is a DOC. The second aftertreatment device 530 may be a main DOC, wherein the first aftertreatment device 520 is sized smaller than the second aftertreatment device 530.

In one example, the first aftertreatment device 520 is sized to maintain a high HC and CO conversion efficiency when the turbine bypass valve is open. For example, the first aftertreatment device 520 cross-sectional area may be reduced while increasing cell density with an overall volume/mass being sized to achieve a desired space velocity and a desired low thermal inertia for rapid heating. Thus, under conditions where the second aftertreatment device 530 is less than a threshold temperature, the first aftertreatment device may be used to treat emissions. Such a condition may include a cold-start or prolonged coasting event where catalyst temperatures may decrease.

A second injector 540 is arranged downstream of the second aftertreatment device 530 relative to a direction of exhaust gas flow. The second injector 540 may be positioned to inject directly into the exhaust passage 502 toward a first mixer 542. The first mixer 542 may mix exhaust gases with an injection from the second injector 540, which may include urea or fuel. The mixture may flow to a first selective catalytic reduction (SCR) device 544 and a second SCR device 546. An ammonia oxidation device 548 may be arranged downstream of the second SCR device.

A third injector 560 is arranged downstream of the ammonia oxidation device 548 and upstream of a second mixer 562. The second mixer 562 may mix exhaust gases with an injection from the third injector 560, wherein the injection may be an air injection or a fuel injection, in one example. The second mixer 562 may mix exhaust gases with the injection prior to flowing the exhaust gases to a third DOC 564 and to a particulate filter 566.

The second embodiment 550 may differ from the first embodiment 500 in that an injector 570 is arranged adjacent to the intersection between the bypass passage 504 and the exhaust passage 502. The injector 570 may be configured to inject toward a third mixer 572. In one example, the injector 570 injects urea or fuel and the third mixer 572 is shaped to mix exhaust gases with the injection. The mixture may then flow to the third SCR device 574, with an ammonia oxidation catalyst 576 arranged downstream thereof.

The second embodiment 550 may include the third injector 560, the second mixer 562, the third DOC 564, and the particulate filter 566 downstream of the ammonia oxidation catalyst 576. The second embodiment 550 may further include the second injector 540, the first mixer 542, the first SCR device 544, the second SCR device 546, and the ammonia oxidation catalyst 548 downstream of the particulate filter 566.

In this way, modes of operation described below may be executed based on temperatures of one or more catalysts. For example, with respect to the first embodiment 500 and the second embodiment, turbine bypass operations may be based on a temperature of an SCR device arranged closed to the turbine 510. Operation of the electric heater may be based on a temperature of the first DOC 520 and the second DOC 530 in the first embodiment 500 and only the temperature of the first DOC 520 in the second embodiment 550. Temperatures of the various devices arranged in the exhaust passage 502 and the bypass passage 504 may be determined via one or more temperature sensors. Additionally or alternatively, temperatures of the various devices may be estimated based on data stored in a multi-input look-up table, wherein inputs include one or more of engine speed, engine load, throttle position, engine temperature, ambient temperature, and the like.

As is known to those of ordinary skill in the art, the DOC may be configured to convert hydrocarbons and CO into $CO_2$. This oxidation producing heat as a further byproduct. The heat released by the DOC may be used to heat one or more SCR devices in the exhaust passage 502, wherein the SCR device may be configured to reduce $NO_x$ to $N_2$ and $CO_2$ in the presence of a reductant, such as fuel or urea. However, the SCR device may be catalytically active only above a threshold SCR temperature (e.g., 200 to 250 degrees F.). As such, methods for heating the SCR device in response to it being less than the threshold SCR temperature are described herein.

In the methods presented herein, embodiments of any of the FIGS. 1-5B may be used to executed the catalyst heating mode. FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 6, it shows a chart 600 illustrating a plurality of modes executed in response to one or more catalyst temperatures. Modes 1, 2, 3, 4, and 5, may include where a second catalyst temperature is greater than or equal to a threshold second catalyst temperature. A bypass catalyst temperature and a first catalyst temperature may vary relative to respective thresholds, however, either of these catalysts falling below a respective threshold does not trigger a turbine bypass mode.

More specifically, modes 1, 2, 3, 4, and 5 correspond to bypass valve closed modes wherein exhaust gases are directed to the turbine. The modes 1 through 5 may include a transition from a turbine bypass valve open mode to the turbine bypass valve closed mode or may continue operating from the bypass valve closed mode. Mode 1 may include where the bypass catalyst temperature is greater than or equal to a threshold bypass catalyst temperature, the first catalyst temperature is greater than or equal to a threshold first catalyst temperature, and the second catalyst temperature is greater than or equal to the threshold second catalyst temperature. In one example, the threshold bypass catalyst temperature, the threshold first catalyst temperature, and the threshold second catalyst temperature are non-zero positive numbers, each corresponding to a light-off temperature of their respective catalysts. Thus, mode 1 may include where each of the catalysts is lit-off and heating is not desired.

The bypass catalyst may be arranged in the bypass passage and the first catalyst may be arranged adjacent to an intersection between the bypass passage and the exhaust passage downstream of the turbine. The second catalyst may be arranged downstream of the first catalyst. In one example, the bypass catalyst is the first DOC 520 of FIG. 5A, the first catalyst is the second DOC 530 of FIG. 5A, and the second catalyst is the first SCR device 544 of FIG. 5A.

In mode 2, the bypass catalyst temperature is less than the threshold bypass catalyst temperature, the first catalyst temperature is greater than or equal to the threshold first catalyst temperature, and the second catalyst temperature is greater than or equal to the threshold second catalyst temperature. In one example, mode 2 may occur following an extended period of engine operation where the bypass valve (e.g., bypass valve 310 of FIG. 3) has remained closed. However, bypass may not be initiated due to the first catalyst (e.g., the second DOC) being lit-off.

In mode 3, each of the bypass catalyst temperature and the first catalyst temperature are less than the threshold bypass catalyst temperature and the threshold first catalyst temperature, respectively. In one example, in response to mode 2 or mode 3 conditions being met, the modes may include adjusting a position of vanes of the turbine to bypass a portion of exhaust gases through a bypass passage toward the bypass catalyst. In one example, if an engine speed and an engine load are within a range where vanes may be slightly closed while still meeting a desired turbine operation based on a demanded boost, then the bypass valve may be partially opened to allow exhaust flow to the bypass catalyst. A controller may signal to an actuator of the bypass valve to adjust the position of the bypass valve from a closed position to a partially open position in response to the bypass catalyst temperature being less than the threshold bypass catalyst temperature. The vanes may be continuously adjusted via a signal to an actuator thereof from a controller to maintain a desired pressure upstream and downstream of the turbine to allow bypass flow.

In mode 4, the bypass catalyst temperature is greater than or equal to the threshold bypass catalyst temperature and the first catalyst temperature is less than the threshold first catalyst temperature. However, since the second catalyst temperature is greater than or equal to the threshold second catalyst temperature, the bypass remains closed. In one example, an engine air/fuel ratio is adjusted to be more lean, thereby allowing the second catalyst to decrease $NO_x$ produced.

Modes 6-9 include where the second catalyst temperature (e.g., first SCR device) is less than the threshold second catalyst temperature (e.g., the threshold SCR temperature). If the engine speed is less than a threshold engine speed and an engine load is less than a threshold engine load, then a bypass mode (modes 6-9) may be entered. In one example, entering the bypass mode may further include estimating upcoming driving conditions to determine if the engine speed and the engine load will remain below their respective thresholds for a period of time sufficient to heat the second catalyst. If driver demand is too high such that an amount of boost desired block bypassing of the turbine, then the bypass mode may not be entered even in response to the second catalyst being less than the threshold second catalyst temperature. Estimating the upcoming driving conditions may be based on feedback from a GPS device or via traffic data provided via vehicles within a common geofenced area or the like. The bypass mode entry conditions may be further based on an air/fuel ratio remaining greater than a threshold air/fuel ratio, wherein the threshold air/fuel ratio is based on the engine speed, the engine load, and an emissions limit of the geofenced area.

Entering the turbine bypass mode may include a controller signaling to an actuator of the bypass valve to adjust the bypass valve to a fully open position. In one example, the bypass valve may be actuated to the fully open position, which allow a maximum gas flow, a fully closed position which blocks gas flow, or positions therebetween. Vanes of the turbine may be adjusted to at least a partially closed position. In one example, the controller signals to an actuator to actuate the vanes to a fully closed position in response to the turbine bypass mode being initiated. Additionally or alternatively, a plurality of first vanes of a twin-scroll turbine or divided inlet turbine may be adjusted to the fully closed position and a plurality of second vanes of the twin-scroll turbine or divided inlet turbine may be adjusted to a more closed position or the fully closed position based on a boost demand and/or a driver demand. In one example, each of the plurality of first and second vanes is adjusted to the fully closed position to maximize a turbine bypass fraction, which is a ratio of a mass flow rate through the bypass passage relative to a mass flow rate of air and fuel to the engine. The enthalpy of the turbine is now reduced despite the vanes being closed, which may allow modes 6-9 to utilize the exhaust heat to heat one or more catalysts of the exhaust passage.

In one example, transitioning from a turbine bypass closed mode to a turbine bypass open mode comprises determining an intake throttle position open setpoint. The intake throttle open position open setpoint may be based on a balance between a pressure differential between a first inlet and a second inlet of the turbine along with a desired EGR flow rate to maintain emissions below an emissions threshold during the turbine bypass open mode. In one example, the intake throttle position open setpoint may include a range, wherein a minimum value of the range is selected to promote exhaust gas flow from the second inlet, to the first inlet, and into the bypass passage, while still maintaining emission generation less than the emissions threshold.

The desired EGR flow rate may be further based on mitigating a flow of rich exhaust gas to the turbine. In one example, a fuel injector, such as fuel injector 524 of FIGS. 5A and 5B is arranged in the bypass passage, and the EGR flow rate may be based on only limiting $NO_x$ production. As another example, excess fuel is provided to the bypass passage and emissions control system via fuel injectors of the engine wherein one or more of a primary fuel injection mass is increased, a post-fuel injection mass is increased, a fuel injection timing is retarded, or the like. The EGR flow rate may be adjusted to maintain a pressure of the second scroll being greater than a pressure of the first scroll to mitigate an amount of richer exhaust gas flowing through the turbine. In one example, the EGR flow rate is reduced by moving an EGR valve to a more closed position and/or the intake throttle valve to a more open position.

The transitioning further includes adjusting the bypass valve to an at least partially open position and adjusting the vanes to an at least partially closed position. Fuel injection mass and/or timing may be adjusted during the bypass open modes to both meet the air/fuel threshold while also providing an amount of unburned fuel to the bypass catalyst.

Modes 7, 8, and 9 relate to bypass open modes wherein an electric heater, such as electric heater 522 of FIG. 5B is activated. The electric heater may be activated in response to the bypass catalyst temperature being less than the threshold bypass catalyst temperature and/or the first catalyst temperature being less than the threshold first catalyst temperature. Additionally or alternatively, the electric heater may be activated in response to a battery state of charge (SOC) being greater than a threshold SOC. The threshold SOC may be a positive value. In one example, the threshold SOC is equal to a percentage of a total SOC (e.g., 20%, or 10%, or 5%). Additionally or alternatively, threshold SOC may be based on a current driver electrical demand, wherein the threshold SOC may increase in response to the current driver electrical demand increasing.

During mode 7, the bypass catalyst temperature is greater than or equal to the threshold bypass catalyst temperature and ready for injections for the bypass injector and/or for fuel slip from the engine. However, the first catalyst temperature is less than the threshold first catalyst temperature and unable to oxidize fuel slipping through the turbine. As such, the electric heater may be activated to more quickly heat the first catalyst.

During mode 8, the bypass catalyst is not lit-off. As such, the electric heater is activated to either directly heat the bypass catalyst or to heat exhaust gases flowing to the bypass catalyst. The first catalyst temperature is greater than or equal to the threshold first catalyst temperature, and therefore positioned to treat fuel slip through the bypass catalyst or the turbine.

During mode 9, each of the bypass catalyst and the first catalyst temperatures are less than corresponding thresholds. As such, the electric heater may be activated to more quickly heat each of the bypass catalyst and the first catalyst. In one example, mode 9 may be initiated upon a vehicle cold-start, wherein once the bypass catalyst temperature is greater than or equal to the threshold bypass catalyst temperature, mode 7 is initiated, followed by mode 6 during a remainder of a cold-start.

Mode 6 may include where each of the bypass catalyst and the first catalyst temperatures are greater than or equal to corresponding thresholds. As such, the bypass catalyst and the first catalyst may be configured to oxidize fuel flowing therethrough, thereby allowing a bypass fuel injection to occur (e.g., unburned fuel flow from the engine). During mode 6, the EGR flow rate may be reduced to block the fuel from entering the turbine. By moving the EGR valve to a more closed position, the second inlet pressure may increase and remain greater than the first inlet pressure, thereby promoting exhaust flow from the second inlet to the first inlet. Exhaust flow from the first inlet to the second inlet may be mitigated.

Fuel injections at the engine configured to remain unburned and flow to the turbine may be metered as a function of a desired exotherm temperature along with a mass flow rate through the bypass passage. In one example, the mass flow rate may be estimated based on a temperature upstream of the turbine, a pressure of first and second inlets, a pressure downstream of the turbine where the bypass passage and exhaust passage intersect, a bypass valve position, and a position of vanes of the turbine. The exotherm temperature, which is a temperature of exhaust gases leaving the bypass catalyst, may be determined based on a difference between a temperature downstream of the turbine and the temperature upstream of the turbine. The fuel injection amount may be adjusted based on the difference between the desired exotherm temperature and an actual exotherm temperature along with the mass flow rate. For example, if the difference decreases and the actual temperature is closer to the desired exotherm temperature, then the fuel injection amount may decrease relative to the difference increasing.

Alternatively, if an injector is mounted in the bypass passage upstream of the bypass catalyst, then the fuel injection amount may be based on only the desired exotherm temperature. In some examples, additionally or alternatively, if the bypass catalyst temperature falls below the threshold bypass catalyst temperature during mode 6, then the electric heater may be activated (e.g., if the battery SOC is greater than the threshold SOC) to increase the bypass catalyst temperature. In one example, the bypass catalyst may be cooled due to the fuel injection flowing thereto.

Turning now to FIGS. 7A, 7B, and 7C, they show a method 700 for executing modes 1-9 of FIG. 6. Instructions for carrying out method 700 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below. Method 700 may be executed in combination with any of the systems of FIGS. 1-5B.

The method 700 begins at 702, which includes determining current operating parameters. Current operating parameters may include but are not limited to manifold pressure, intake throttle position, engine speed, engine load, engine temperature, EGR flow rate, and air/fuel ratio.

The method 700 may proceed to 704, which includes determining if an SCR temperature is less than a threshold SCR temperature. In one example, the SCR temperature is identical to the second catalyst temperature of FIG. 6. The SCR temperature may be estimated based on an exhaust gas temperature upstream or downstream thereof. As another example, a temperature sensor may be arranged directly downstream or upstream of the SCR device. Additionally or alternatively, the temperature sensor may be integrally arranged within the SCR device.

If the SCR device temperature is not less than a threshold SCR temperature, then the SCR device may be lit-off and the method 700 may proceed to 706, which includes executing a bypass closed mode. The bypass closed mode may include one of modes 1 through 5 of FIG. 6.

If the SCR device temperature is less than the threshold SCR temperature, then the method 700 may proceed to 708, which includes determining if an air/fuel ratio is greater than a threshold air/fuel ratio. In one example, the threshold air/fuel ratio may be a dynamic value, adjusted in response to a bypass DOC temperature and a main DOC temperature. For example, the threshold air/fuel ratio may decrease in response to one or more of the bypass DOC temperature and the main DOC temperature being greater than or equal to light-off temperatures. As another example, the threshold air/fuel ratio may be based on a non-zero, positive number. The threshold air/fuel ratio is based on emission limit of an area in which the vehicle is located.

If the air/fuel ratio is not greater than the threshold air/fuel ratio, then the method 700 may proceed to 706, where a bypass closed mode is executed as described above.

If the air/fuel ratio is greater than or equal to the threshold air/fuel ratio, then the method 700 may proceed to 710, which includes adjusting an intake throttle position. In one example, adjusting the intake throttle position may include determining intake throttle open setpoints at a current engine speed and/or a current engine load. The intake throttle open setpoints may be based on one or more of an engine delta pressure, an EGR flow rate, and a $NO_x$ output through a tailpipe. In one example, a relatively constant manifold absolute pressure (MAP) may be desired to provide a desired EGR flowrate. The EGR flow rate may correspond to a relatively small range of MAPs, wherein the small range of MAPs correspond to intake throttle setpoints. Additionally or alternatively, the intake throttle open setpoints may be based on a range of positions in which emissions are less than a threshold level, combustion stability is greater than a threshold stability for a current engine speed and load during the turbine bypass open mode, and an EGR flow rate is equal to a desired flow rate. The threshold level of emissions may be based on a local governing body standard and is a non-zero, positive number. The threshold stability may be based on a desired combustion stability, wherein stabilities less than the threshold stability may result in knock, misfire, or the like.

Adjusting the throttle may further include includes adjusting the throttle to a lowest intake throttle open setpoint via a signal from a controller to an actuator of the throttle. That is to say, the throttle may be actuated to a minimum open position of the intake throttle open setpoints (e.g., a least open position of the setpoints) to allow a desired EGR flow rate to be maintained during the turbine bypass open mode while meeting emissions and combustion stability conditions. In this way, the delta pressure across the engine, which is based on the throttle position, engine speed, and engine load, may be sufficiently low to maintain a desired EGR flow rate during the turbine bypass open mode. The EGR valve may be further adjusted to an open position based on an EGR desired flow rate. In one example, the EGR desired flow rate is based on a $NO_x$ production during the turbine bypass open mode, wherein the EGR desired flow rate may increase as the $NO_x$ production increases.

The method 700 may proceed to 712, which includes opening the bypass valve. In one example, opening the bypass valve may include where the controller signals to the actuator of the bypass valve to overcome a spring or other resistant element thereof and move the bypass valve to an at least partially open position. In one example, the controller may signal to the actuator to open the bypass valve to a fully open position. In some examples, the bypass valve may be adjustable to only a fully closed position or a fully open position, which may decrease a cost and a complexity of the bypass valve relative to a variable position controlled bypass valve. In other examples, additionally or alternatively, the bypass valve may be adjustable to the fully closed position, the fully open position, or to positions therebetween, while this may increase a manufacturing cost, greater fine tuning of exhaust flow around the turbine may be achieved, which may increase fuel economy and reduce emissions.

By bypassing exhaust gases around the turbine, mass air flow rates are reduced due to reduced enthalpy to the turbine. As described above, entry conditions to the catalyst heating may include where the boost demand is reduced. Furthermore, an intake throttle, in combination with an EGR valve, may be adjust to meet a minimum air/fuel ratio demand during the catalyst heating to reduce emissions and maintain combustion stability. Adjusting of the intake throttle and the EGR valve are described in greater detail below.

The method 700 may proceed to 714, which includes adjusting turbine vanes to adjust a restriction of the turbine scrolls. The vanes may be adjusted to block at least a portion of a scroll inlet via a signal sent from a controller to an actuator thereof. In one example, a plurality of first vanes adjust an inlet opening of a first scroll and/or a first inlet and a plurality of second vanes adjust an inlet opening of a second scroll and/or a second inlet. A first, single actuator may be configured to actuate each of the plurality of first vanes and a second, single actuator may be configured to actuate each of the plurality of second vanes, thereby reducing a manufacturing cost relative to actuating each vane individually. Additionally or alternatively, each vanes of the pluralities of first and second vanes may be actuated via a corresponding actuator such that each vane may be individually actuated, thereby providing greater flow control within the turbine. In one example, the vanes are adjusted to fully close inlets of the first and second scrolls such that exhaust gas bypasses each of the scrolls and flow directly to the bypass catalyst. As another example, additionally or alternatively, vanes of only the first scroll may be actuated to a fully closed position such that exhaust gases from one bank of the engine may continue to flow to the second scroll while exhaust gases from another bank bypass the first scroll and flow directly to the bypass catalyst. As such, an amount of boost demand may continue to be met during the catalyst heating. Additionally or alternatively, the plurality of second vanes may be more open than the plurality of first vanes in response to a difference between the temperature of the catalyst and the threshold temperature, wherein as the difference increases, the second vanes are opened to a greater magnitude.

The method 700 may proceed to 716, which includes determining if the bypass DOC temperature is greater than or equal to the threshold bypass DOC temperature. In one example, the bypass DOC temperature is identical to the threshold bypass catalyst temperature. The threshold bypass DOC temperature may be a fixed value, based on a non-zero positive number corresponding to a light-off temperature of the bypass DOC. If the bypass DOC temperature is not greater than or equal to the threshold bypass diesel oxidation temperature, then the method 700 may proceed to 732 of FIG. 7C, as will be described in greater detail below.

If the bypass DOC temperature is greater than or equal to the threshold bypass DOC temperature, then the method 700 may proceed to 718, which may include determining if a main DOC temperature is greater than or equal to the threshold main DOC temperature. In one example, the threshold main DOC temperature is identical to the threshold first catalyst temperature. The threshold main DOC temperature may be a fixed value, based on a non-zero positive number corresponding to a light-off temperature of the main DOC. If the main DOC temperature is not greater than or equal to the threshold main DOC temperature, then the method 700 may proceed to 732 of FIG. 7C, as will be described in greater detail below.

If the main DOC temperature is greater than or equal to the threshold main DOC temperature, then the method 700 may proceed to 720, which may include entering mode 6 of FIG. 6. As described above, mode 6 includes where the bypass DOC and the main DOC temperatures are greater than respective thresholds. As such, the bypass and main DOCs may be configured to oxidize unburned fuels, thereby generating an exotherm, which may be used to heat the SCR device.

The method 700 may proceed to 722, which includes adjusting a fuel injection. In one example, the fuel injection corresponds to a fuel injection to an engine cylinder, wherein the fuel injection is a primary injection or a post-injection. In one example, mass of the primary injection or the post-injection is increased. Additionally or alternatively, a timing of the primary injection or the post-injection may be retarded. In one example, the fuel injection is adjusted in response to an actual exotherm temperature being different than a desired exotherm temperature. The actual exotherm temperature may be calculated by determining a difference in exhaust gas temperatures upstream and downstream of the bypass and main DOCs. The desired exotherm temperature may be based on a one or more conditions including an estimated duration of mode 6, the temperature of the bypass DOC, the temperature of the main DOC, and a battery SOC. In one example, the desired exotherm temperature may increase in response to the estimated duration of mode 6 decreasing. As another example, the desired exotherm temperature may increase in response to the bypass DOC temperature or the main DOC temperature increasing. As a further example, the desired exotherm temperature may increase in response to the battery SOC increasing. As a difference between the desired exotherm temperature and the actual exotherm temperature increases, then the fuel injection amount may also increase. The fuel injection may be adjusted in further response to the air/fuel ratio (e.g., maintaining the air/fuel ratio above the threshold air/fuel ratio).

Additionally or alternatively, an injector may be arranged in the bypass passage and positioned to inject toward the bypass DOC. In such an example, air/fuel ratio and other conditions may be ignored and the fuel injection may be set based on the difference between the desired exotherm temperature and the actual exotherm temperature.

The method 700 may proceed to 724, to adjust an EGR flow rate. In some examples, the EGR flow rate may be adjusted to decrease emissions and to adjust a pressure differential between inlets of the turbine. For example, the EGR flow rate may be reduced to further increase a second inlet pressure, from which the EGR passage branches, relative to a first inlet pressure, from which the bypass passage branches. By doing this, exhaust gases from the second inlet are promoted to flow to the first inlet and into the bypass passage, thereby decreasing an amount of fuel entering the turbine. This may increase a longevity of the turbine and enhance its performance following the bypass.

The method 700 may proceed to 726, which includes determining if a battery SOC is greater than a threshold SOC. The threshold SOC may be based on a lower limit of the battery SOC. For example, the threshold SOC may be equal to 20% of a total battery SOC. Additionally or alternatively, the threshold SOC may be equal to 15%, or 10%, or 5% of the total battery SOC. If the battery SOC is not greater than the threshold SOC, then the method 700 may proceed to 728, which includes not activating the electric heater.

If the battery SOC is greater than the threshold SOC, then the method 700 may proceed to 730, which includes activating the electric heater. In one example, the electric heater is activated to maintain the bypass DOC temperature above the threshold bypass DOC temperature. Due to the unburned fuel flowing thereto, the bypass DOC temperature may decrease during the turbine bypass mode. As such, the electric heater may maintain the bypass DOC temperature and increase a duration in which the bypass mode may be executed. In some examples, the electric heater may not be activated during the bypass mode until the bypass DOC temperature falls below the threshold bypass DOC temperature. By doing this, the battery SOC may be preserved.

Returning to 716 and 718, if "no" is determined, then the method 700 may proceed to 732, which includes determining if a battery SOC is greater than a threshold SOC, as described above with respect to 726. If the battery SOC is not greater than the threshold SOC, then the method 700 may proceed to 734, which includes not activating the electric heater. The method 700 may continue flowing exhaust gas to the turbine and a bypass mode is not entered. As such, one of modes 1-5 is executed.

If the battery SOC is greater than the threshold SOC, then the method 700 may proceed to 736, which includes activating the electric heater and heating the DOC(s). In one example, a magnitude at which the electric heater is activated may be based on a temperature difference between the DOC(s) and their corresponding thresholds. The magnitude may be further based on if only one of or both of the bypass DOC and the main DOC temperatures are less than corresponding thresholds. For example, if each of the bypass DOC and the main DOC temperatures are less than the threshold bypass DOC and main DOC temperatures, then the electric heater may be set to a highest magnitude. As another example, if only the bypass DOC temperature is less than the threshold bypass DOC temperature and a difference between the two is relatively small, then the electric heater may be set to a lower magnitude, thereby providing less heating and consuming less voltage than the highest magnitude.

The method 700 may proceed to 738, which includes determining if the bypass DOC temperature and/or the main DOC temperature is greater than or equal to the threshold bypass DOC temperature and/or the threshold main DOC temperature, respectively. If one or more of the DOC temperatures is less than a corresponding threshold, then the method 700 may proceed to 740, which includes continuing to monitor DOC temperatures.

If each of the DOC temperatures is greater than or equal to corresponding thresholds, then the method 700 may proceed to 742, which includes entering mode 6, as described above at 720. In one example, the electric heater may be deactivated upon entering mode 6.

Turning now to FIG. 8, it shows a graph 800 illustrating a prophetic engine operating sequence based on the method 700 of FIGS. 7A-7C combined with the systems of FIGS. 1-5A. Plot 810 illustrates a bypass DOC temperature and dashed line 812 illustrates a threshold bypass DOC temperature. Plot 820 illustrates a main DOC temperature and dashed line 822 illustrates a threshold main DOC temperature. Plot 830 illustrates an SCR temperature and dashed line 832 illustrates a threshold SCR temperature. Plot 840 illustrates a battery SOC and dashed line 842 illustrates a threshold battery SOC. Plot 850 illustrates an electric heater activity. Plot 860 illustrates a mode being executed. Plot 870 illustrates if a bypass injection is occurring. Plot 880 illustrates an EGR valve position. Time increases along an abscissa from a left to a right side of the figure.

Prior to t1, one of modes 1-5 is being executed (plot 860), which corresponds to a turbine bypass closed mode. During the turbine bypass closed mode, the bypass DOC temperature (plot 810) decreases toward the threshold bypass DOC temperature (plot 812), the main DOC temperature (plot 820) decreases toward the threshold main DOC temperature (plot 822), and the SCR temperature (plot 830) decreases toward the threshold SCR temperature (plot 832). The electric heater is deactivated (plot 850) and battery SOC is not being consumed (plot 840). A bypass injection is not occurring (plot 870) and an EGR valve position (plot 880) is between a fully open and a fully closed position.

At t1, the bypass DOC temperature decreases below the threshold bypass DOC temperature, the main DOC temperature decreases below the threshold main DOC temperature, and the SCR temperature decreases below the threshold SCR temperature. Due to each of the aftertreatment device temperatures being below respective thresholds and the battery SOC being greater than the threshold battery SOC, then the electric heater is activated and one of modes 7-9 is initiated to heat the bypass DOC and the main DOC. Thus, a turbine bypass open mode is initiated. Between t1 and t2, the electric heater is active and temperatures of the bypass DOC and main DOC increase via heat from exhaust gas and from the electric heater. The bypass DOC temperature increases more rapidly than the main DOC temperature due to its location upstream of the main DOC and its smaller size.

At t2, the bypass DOC temperature is greater than or equal to the threshold bypass DOC temperature. As such, the bypass DOC may be configured to oxidize fuel flowing thereto. The bypass fuel injection is activated, which may provide more heat to the main DOC and the SCR device. Between t2 and t3, temperatures of the main DOC and the SCR device begin to increase. The electric heater remains active due to the main DOC temperature still being below the threshold main DOC temperature and the battery SOC being greater than the threshold SOC.

At t3, the main DOC temperature is greater than the threshold main DOC temperature. In response, the electric heater is deactivated and battery SOC is no longer consumed. In one example, a mass of the bypass injection may be increased which may increase heat produced via the oxidation processes of the bypass DOC and the main DOC, thereby more rapidly heating the SCR device. Between t3 and t4, the main DOC temperature and the bypass DOC temperature decrease due to the bypass injections. The SCR temperature increases as the DOCS oxidize fuel flowing therethrough, producing heat as a byproduct.

In one example, the EGR valve is moved to a more closed position relative to a previous position to increase a pressure of an inlet of the turbine. As illustrated in the example of FIG. 3, a first inlet of the turbine may include where the bypass passage branches therefrom and a second inlet may include where the EGR passage branches therefrom. The EGR valve may be adjusted to a more closed position to increase a pressure of the second inlet, thereby promoting exhaust gas flow from the second inlet, to the first inlet, and into the bypass passage. By doing this, more exhaust gas may enter the bypass passage, resulting in less thermal transfer to the turbine housing.

At t4, the SCR temperature is greater than the threshold SCR temperature. The main DOC temperature falls below the threshold main DOC temperature. In one example, the temperature of the main DOC temperature may decrease below the threshold main DOC temperature due to the fuel injections, which may include relatively cold fuel contact surfaces of the main DOC. In one example, the mode is switched to one of modes 7-9, which includes activating the electric heater and maintaining executing the turbine bypass open mode. Between t4 and t5, the main DOC temperature increases via the electric heater being active. The fuel injector is deactivated and fuel injections may not occur. In one example, the fuel injector may remain active and an amount of fuel being injected therefrom may be reduced relative to the amount injected between t3 and t4. At t5, the main DOC temperature increases above the threshold main DOC temperature.

As such, temperatures of each of the aftertreatment devices is above a corresponding threshold and heating may not be requested. The electric heater is deactivated and battery SOC is no longer consumed. As such, the mode is switched to a turbine bypass closed mode (e.g., one of modes 1-5). After t5, the turbine bypass closed mode continues.

An embodiment of a system includes a turbine comprising a bypass and a bypass valve, a first catalyst arranged in the bypass, a second catalyst arranged in an exhaust passage downstream of an intersection between the bypass and the exhaust passage relative to a direction of exhaust gas flow, a plurality of vanes configured to adjust gas flow through one or more inlets of the turbine, and a controller programmed to adjust a position of the bypass valve and the plurality of vanes in response to one or more of a first catalyst temperature being less than a threshold first catalyst temperature and a second catalyst temperature being less than a threshold second catalyst temperature. A first example of the system further includes a third catalyst arranged downstream of the second catalyst, wherein the third catalyst is different than the second catalyst and the first catalyst. A second example of the system, optionally including the first example, further includes where the third catalyst is a selective catalytic reduction (SCR) device. A third example of the system, optionally including one or more of the previous examples, further includes where an injector positioned to inject directly into the bypass, and wherein the instructions further cause the controller to activate the injector in response to the first catalyst temperature being greater than or equal to the threshold first catalyst temperature and the second catalyst temperature being less than the threshold second catalyst temperature. A fourth example of the system, optionally including one or more of the previous examples, further includes an electric heater arranged in the bypass upstream of the first catalyst. A fifth example of the system, optionally including one or more of the previous examples, further includes where the instructions further enable the controller to activate the electric heater in response to the first catalyst temperature being less than the threshold first catalyst temperature and adjust fueling parameters of a cylinder bank of an engine to execute post-combustion fuel injections and flow unburned fuel to the first catalyst. A sixth example of the system, optionally including one or more of the previous examples, further includes where the first catalyst is a diesel oxidation catalyst and the second catalyst is a selective reduction catalyst (SCR).

An embodiment of a method for operating an engine, comprises flowing exhaust through a first scroll of a turbocharger, flowing exhaust through a second scroll of the turbocharger, flowing exhaust through a turbine bypass passage of the turbocharger in response to a temperature of a selective-catalytic-reduction (SCR) device via adjusting a position of turbine nozzle vanes of one or more of the first scroll and the second scroll, and injecting fuel directly into the turbine bypass passage via a fuel injector in response to a temperature of a bypass diesel oxidation catalyst (DOC) being greater than or equal to a threshold bypass DOC temperature. A first example of the method, further includes deactivating the fuel injector in response to the temperature of the bypass DOC being less than the threshold bypass DOC temperature. A second example of the method, optionally including the first example, further includes activating an electric heater in response to the temperature of the bypass DOC being less than the threshold bypass DOC temperature. A third example of the method, optionally including one or more of the previous examples, further includes flowing exhaust through the turbine bypass passage in response to a temperature of a main DOC being less than a threshold main DOC temperature. A fourth example of the method, optionally including one or more of the previous examples, further includes where flowing exhaust through the turbine bypass passage comprises actuating a turbine bypass valve to an open position. A fifth example of the method, optionally including one or more of the previous examples, further includes where flowing exhaust through the turbine bypass passage comprises an air/fuel ratio being greater than a threshold air/fuel ratio. A sixth example of the method, optionally including one or more of the previous examples, further includes where the temperature of the SCR device is less than a threshold SCR temperature. A seventh example of the method, optionally including one or more of the previous examples, further includes where adjusting a position of an exhaust-gas recirculate (EGR) valve in response to a pressure difference between the first scroll and the second scroll, further comprising adjusting a position of an intake throttle in response to the pressure difference.

An embodiment of an engine system, comprises an engine comprising a first group of cylinders configured to flow exhaust gases to a first scroll of a turbine and a second group of cylinders configured to flow exhaust gases to a second scroll of the turbine, a turbine bypass passage comprising a bypass valve configured to adjust an amount of exhaust gases bypassing from the first and second scrolls, a first catalyst arranged in the turbine bypass passage, an electric heater arranged in the turbine bypass passage upstream of the first catalyst relative to a direction of exhaust gas flow, a second catalyst arranged in an exhaust passage downstream of an intersection between the exhaust passage and the turbine bypass passage, a third catalyst arranged in the exhaust passage downstream of the second catalyst, and a controller with computer-readable instructions stored on non-transitory memory thereof that when executed cause the controller to:

flow exhaust gas from the first group of cylinders to the first scroll and from the second group of cylinders to the second scroll in response to a temperature of the third catalyst is less than a threshold third catalyst temperature, and bypass exhaust gas via opening the bypass valve in response to the temperature of the third catalyst being less than the threshold third catalyst temperature. A first example of the engine system further includes where the first catalyst is a diesel oxidation catalyst, the second catalyst is a diesel oxidation catalyst, and the third catalyst is a selective catalytic reduction device. A second example of the engine system, optionally including the first example, further includes where the instructions further enable the controller to adjust engine fuel injections to increase an amount of unburned fuel flowing to the first catalyst. A third example of the engine system, optionally including one or more of the previous examples, further includes where the instructions further enable the controller to adjust the amount of unburned fuel flowing to the first catalyst in response to an actual exotherm temperature deviating from a desired temperature of a component downstream of an intersection between the exhaust passage and the turbine bypass passage. A fourth example of the engine system, optionally including one or more of the previous examples, further includes where the instructions further enable the controller to activate the electric heater in response to one or more of a temperature of the first catalyst being less than a threshold first catalyst temperature and a temperature of the second catalyst being less than a threshold second catalyst temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a turbine comprising a bypass and a bypass valve;
a first catalyst arranged in the bypass;
a second catalyst and a third catalyst arranged in an exhaust passage downstream of an intersection between the bypass and the exhaust passage relative to a direction of exhaust gas flow;
an electric heater arranged in the bypass upstream of the first catalyst;
a plurality of vanes configured to adjust gas flow through one or more inlets of the turbine; and
a controller programmed to adjust a position of the bypass valve and the plurality of vanes and to operate in at least a first mode, a second mode, and a third mode, the first mode including opening the bypass valve, not activating the heater, in response to a third catalyst temperature of the third catalyst being greater than a threshold third catalyst temperature, where a first catalyst temperature of the first catalyst and a second catalyst temperature of the first catalyst vary relative to respective thresholds, however, either of these catalysts falling below its respective threshold does not trigger a turbine bypass mode, a second mode including not activating the heater while bypassing exhaust flow around the turbine in response to the third catalyst temperature of the third catalyst being less than the threshold third catalyst temperature, and the third mode including activating the heater while bypassing exhaust flow around the turbine in response the first catalyst temperature of the first catalyst and the second catalyst temperature of the second catalyst falling below its respective threshold.

2. The system of claim 1, wherein the third catalyst is different than the second catalyst and the first catalyst.

3. The system of claim 2, wherein the third catalyst is a selective catalytic reduction (SCR) device.

4. The system of claim 1, further comprising an injector positioned to inject directly into the bypass, and wherein the controller further activates the injector in response to the first catalyst temperature being greater than or equal to the threshold first catalyst temperature and the second catalyst temperature being less than the threshold second catalyst temperature.

5. The system of claim 1, wherein the controller further adjusts fueling parameters of a cylinder bank of an engine to execute post-combustion fuel injections and flow unburned fuel to the first catalyst.

6. A method for operating an engine, comprising:
flowing exhaust through a first scroll of a turbocharger;
flowing exhaust through a second scroll of the turbocharger;
flowing exhaust through a turbine bypass passage of the turbocharger in response to a temperature of a selective-catalytic-reduction (SCR) device via adjusting a position of turbine nozzle vanes of one or more of the first scroll and the second scroll;
injecting fuel directly into the turbine bypass passage via a fuel injector in response to a temperature of a bypass diesel oxidation catalyst (DOC) being greater than or equal to a threshold bypass DOC temperature;

adjusting a position of an exhaust-gas recirculate (EGR) valve in response to a pressure difference between the first scroll and the second scroll; and adjusting a position of an intake throttle in response to the pressure difference.

7. The method of claim 6, further comprising deactivating the fuel injector in response to the temperature of the bypass DOC being less than the threshold bypass DOC temperature.

8. The method of claim 7, further comprising activating an electric heater in response to the temperature of the bypass DOC being less than the threshold bypass DOC temperature.

9. The method of claim 6, further comprising flowing exhaust through the turbine bypass passage in response to a temperature of a main DOC being less than a threshold main DOC temperature.

10. The method of claim 6, wherein flowing exhaust through the turbine bypass passage comprises actuating a turbine bypass valve to an open position.

11. The method of claim 6, wherein flowing exhaust through the turbine bypass passage comprises an air/fuel ratio being greater than a threshold air/fuel ratio.

12. The method of claim 6, wherein the temperature of the SCR device is less than a threshold SCR temperature.

13. An engine system, comprising:
  an engine comprising a first group of cylinders configured to flow exhaust gases to a first scroll of a turbine and a second group of cylinders configured to flow exhaust gases to a second scroll of the turbine;
  a turbine bypass passage comprising a bypass valve configured to adjust an amount of exhaust gases bypassing from the first and second scrolls;
  a first catalyst arranged in the turbine bypass passage;
  an electric heater arranged in the turbine bypass passage upstream of the first catalyst relative to a direction of exhaust gas flow;
  a second catalyst arranged in an exhaust passage downstream of an intersection between the exhaust passage and the turbine bypass passage;
  a third catalyst arranged in the exhaust passage downstream of the second catalyst; and
  a controller with computer-readable instructions stored on non-transitory memory thereof that when executed cause the controller to:
    flow exhaust gas from the first group of cylinders to the first scroll and from the second group of cylinders to the second scroll in response to a temperature of the third catalyst is less than a threshold third catalyst temperature; and
    bypass exhaust gas via opening the bypass valve in response to the temperature of the third catalyst being less than the threshold third catalyst temperature.

14. The engine system of claim 13, wherein the first catalyst is a diesel oxidation catalyst, the second catalyst is a diesel oxidation catalyst, and the third catalyst is a selective catalytic reduction device.

15. The engine system of claim 13, wherein the instructions further enable the controller to adjust engine fuel injections to increase an amount of unburned fuel flowing to the first catalyst.

16. The engine system of claim 15, wherein the instructions further enable the controller to adjust the amount of unburned fuel flowing to the first catalyst in response to an actual exotherm temperature deviating from a desired temperature of a component downstream of an intersection between the exhaust passage and the turbine bypass passage.

17. The engine system of claim 13, wherein the instructions further enable the controller to activate the electric heater in response to one or more of a temperature of the first catalyst being less than a threshold first catalyst temperature and a temperature of the second catalyst being less than a threshold second catalyst temperature.

* * * * *